Patented May 16, 1944

2,349,198

UNITED STATES PATENT OFFICE 2,349,198

PLASTIC COMPOSITION AND METHOD OF MAKING THE SAME

Orland M. Reiff and Alfred P. Kozacik, Woodbury, N. J., assignor to Socony-Vacuum Oil Company, Incorporated, New York, N. Y., a corporation of New York No Drawing. Application March 17, 1942, Serial No. 435,078

2 Claims. (Cl. 260—62)

This invention relates to a modified polymerized vinyl resin and is particularly concerned with vinyl resins; particularly styrene and other polymerizable vinyl aromatics; having novel characteristics imparted thereto by reason of polymerization in the presence of aromatic compounds substituted with long chain aliphatic groups and to a process for the preparation of such polymerized vinyl compositions.

The products of the present invention are solid bodies varying in properties with the character and amounts of the modifying agent employed. With the use of a certain group of modifying agents, constituting a preferred embodiment of the invention, there are obtained compositions strongly exhibiting properties characteristic of hard waxes. As the nature of the modifying agent is varied within the scope of the invention, transparent hard resins are formed. Increase in the ratio of polymerizable vinyl compound yields a final product partaking more of the nature of the pure vinyl resin, but the properties of the modified composition are clearly not additive in nature. Products obtained by blending the modifying agents of this invention with vinyl resin resulting from polymerization in the absence of the modifying agent are not comparable in properties to the products resulting from polymerization of the vinyl resin in the presence of the modifying agent. Nor are the properties of the latter the expected additive result considered on the basis of the properties of the pure vinyl resin and the modifying agent. While the properties of the modified vinyl resin may be coordinated somewhat with the variations in properties of the modifying agents, it appears that the relationship is far from a simple function of the properties of the modifying agent and the unmodified vinyl resin.

The character of the complex formed is dependent to some extent on the nature of the aromatic nucleus of the substituted aromatic compound used. The substituted oxyaromatic compounds such as the phenols, naphthols and ethers exhibit better properties for the purposes of the invention in general, particularly in the formation of wax-like compositions, but in most instances, polymers having substantially modified properties may be obtained by the use of substituted aromatic hydrocarbons and other aromatic material which may have substituents other than the alkyl chains characteristic of the invention; variation in the nucleus being compensated, if desired, through changes in amount and character of substitution by long chain alkyl groups as will appear hereinafter. Likewise the invention contemplates aromatic nuclei of the monocyclic, as well as polycyclic types. The principal feature utilized in altering the characteristics of the modifying agent is the nature of the alkyl substituents and the degree of substitution therewith.

Three outstanding features respecting the alkyl substituents as affecting characteristics of the final product have been noted; namely size of the alkyl group, ratio of alkyl substituents to aromatic nuclei and degree of what may be called arylation of the individual alkyl radicals. This last feature is a measure of the number of points of attachment of aromatic nuclei to an individual alkyl group and is best controlled by using a Friedel-Crafts synthesis with aliphatic material of controlled halogen content.

The aliphatic material employed according to the invention in preparing the modifying agent need not be a pure compound and is usually a mixture, but in any event the alkyl substituents are of at least 10 carbon atoms. For example, a suitable modifying agent is prepared by reacting chlorinated Stoddard solvent with aromatic material such as phenol in the presence of a Friedel-Crafts catalyst and in proportions to obtain the desired properties as discussed below. It is preferred, however, that the alkyl substituent groups be of greater dimensions and those derived from petroleum wax and the like are found most suitable. In general, the petroleum waxes are mixtures of aliphatic hydrocarbons having an average of about 24 carbon atoms per molecule, with the predominant portion of the mixture consisting of hydrocarbons of at least 20 carbon atoms, although aliphatic hydrocarbons of as few as 15 carbon atoms are frequently reported in petroleum waxes.

The degree of substitution of both the aryl nuclei and the alkyl groups constituting the modifying agent are well illustrated by reference to such agents as prepared by Friedel-Crafts reactions. That method of preparation permits good control of the properties of the modifying agent and modified resin, wherefore it is preferred. It will be recognized that other methods may be utilized for preparing the agent; as, for example, any of the known alkylation procedures adapted to the purpose; and those skilled in the art will readily perceive the manner of preparing suitable modifying agents by other processes from consideration of the present discussion of preparation by Friedel-Crafts reactions.

A halogenated aliphatic material of at least

10% halogen content, preferably in excess of 15% halogen is reacted with an aromatic material. Low halogen content and low molecular ratio of aromatic material to combined halogen yields a modifying agent which gives a modified vinyl resin of predominantly wax-like characteristics; while an agent produced from reacting high halogen content aliphatics with a high proportion of aromatics causes the resins formed thereby to be hard, transparent bodies which contain a definite percentage of the wax aromatic compound and have properties greatly resembling pure styrene polymers. As a general rule, complexes of strongly wax-like character are obtained by use of substantial quantities, say at least 10%, of a modifying agent derived from chlorinated wax of not more than 25% chlorine reacted with an aromatic in proportions to polyalkylate, that is at least two mols of combined chlorine per mol of aromatic. Non-alkylated aromatics, such as phenol and naphthalene, result in the formation of hard, transparent resins when used as modifying agents in forming styrene resins. Unlike the use of wax aromatic compounds, resins of this type do not have any appreciable amount of the aromatic compound used as modifying agent in combination therewith.

The invention contemplates modification of resins from vinyl compounds such as styrene, alpha methyl styrene and alpha methyl para methyl styrene and is found to be particularly effective in connection with resins from polymerization of styrene. The manner in which properties of the resins vary with amounts and types of modifying agents are well illustrated by the following examples relating to modified styrene resins.

Example I

Styrene was polymerized in the presence of an agent prepared by reacting phenol with chlorinated petroleum wax of 16% chlorine content in the presence of anhydrous aluminum chloride at a molecular ratio of combined chlorine to phenol of 3 to 1. Sixty-one grams of that agent were mixed with 600 grams of a 40% solution of styrene in ethyl benzene and the mixture placed in a liter pressure autoclave. The reaction mass was then heated at 175° C. to 195° C. under 20 to 45 pounds per square inch pressure for 7 hours. After distilling off the major portion of the ethyl benzene from the reaction mixture, superheated steam was introduced to completely remove any solvent or styrene remaining, the maximum temperature during steam distillation being about 200° C. Two hundred forty eight grams of a hard waxy material solidifying at 125° C. to 135° C. were obtained as product.

Example II

In a flask equipped with a reflux condenser, thermometer and glass stirrer a mixture of 400 grams of 40% styrene solution in ethyl benzene and 38 grams of tri-wax phenol prepared from chlorinated wax of 16% chlorine content was heated to 82° C. One gram of metallic sodium to act as polymerization catalyst was added and the reaction mass was heated at 139° C. for 7 hours.

The reaction mixture was diluted with benzene, then one-half of the resulting solution was treated with butyl alcohol followed by addition of hydrochloric acid to neutralize any alkalinity; the excess of acid was washed out with water. The organic solvents were then distilled off at atmospheric pressure; and finally under vacuo to 180° C., at 10 mm. There remained 69 grams of solid, waxy material, brown in color. This material had a melting point range of 140° C. to 150° C.

Example III

One hundred grams of diphenyl ether were reacted with 457 grams of chlorinated wax of 16% chlorine content in the presence of 5 grams of $AlCl_3$ by heating the mixture to 145° C. followed by purifying the reaction product by washing with water until neutral. Two hundred grams of a 40% solution of styrene in ethyl benzene were mixed with 38 grams of the wax-substituted diphenyl ether and then polymerized by heating at 150° C. to 167° C. for about 7 hours in a closed vessel, wherein a pressure of about 35 pounds per square inch was developed. The major part of the ethyl benzene diluent was then distilled off and superheated steam was introduced to completely remove the remaining solvent and any unreacted styrene. One hundred two grams of a hard waxy material solidifying at 120°–130° C. were obtained as product.

Example IV

A quantity of 67.8 grams of naphthalene in solution in 300 grams of ethylene dichloride were reacted with 354 grams of chlorinated wax of 16% chlorine content in the presence of 12.0 grams of $AlCl_3$ as catalyst. The reaction was carried to completion by heating the mixture to about 80° C. and holding there 1 hour. The reaction product was then filtered through Super-filtrol clay and washed with water until neutral, followed by distilling the ethylene dichloride to obtain the purified wax-substituted naphthalene. One hundred grams of the 40% solution of styrene in ethyl benzene were then mixed with 19 grams of the wax naphthalene and polymerized by heating at 162° C. to 172° C. for about 7 hours in an autoclave wherein a pressure of about 50 pounds per square inch was developed. The product was purified as described in the foregoing to give 59 grams of a hard waxy material solidifying at about 122° C. to 127° C.

Example V

Three hundred grams of tri-wax phenol from wax of 14% chlorine content were reacted with 8.06 grams of sodium in solution in 100 c. c. of anhydrous butyl alcohol. The reaction was carried to completion by heating the mixture to 190° C. (alcohol removed by distillation) and holding there for three-quarters of an hour.

Six hundred grams of the 40% solution of styrene in ethyl benzene were then mixed with 61 gramse of the above prepared wax sodium phenate and 1.74 grams of ethylene chlorohydrin, and polymerized by heating at 162° C. to 172° C. for about 6¾ hours in an autoclave wherein a pressure of about 29 pounds per square inch was developed. The reaction mixture was filtered through Hy-Flo, diluted with benzol, washed twice with dilute HCl, finally water-washed until the water layer was neutral. The product was then purified as described in the foregoing to give 243 grams of a hard, waxy material which had a solidifying range of 156°–163° C.

Example VI

Three hundred sixty three grams wax phenol as in Example V were reacted with 5.35 grams metallic sodium (½ the quantity equivalent to the wax phenol) in solution in 100 c. c. anhydrous butyl alcohol. The reaction was carried to completion by heating the mixture to 203° C. (alcohol removed by distillation). The sodium wax phenate-wax phenol mixture was then carboxylated by introducing $CO_2$ at 203° C.–205° C. for 4½ hours. The free wax phenolic acid was then liberated by neutralizing the sodium salt with an equivalent amount of HCl.

Six hundred grams of the 40% solution of styrene in ethyl benzene were mixed with 61 grams of the wax phenolic acid-wax phenol mixture and polymerized by heating at 160° C. to 181° C. for about 7 hours in an autoclave wherein a pressure of about 28 pounds per square inch was developed. The product was purified as described in the foregoing to give 234 grams of a hard wax material with a solidifying range of 145° C.–155° C.

While the preferred method of polymerizing a mixture of styrene and wax phenol consists in heating the mixture in the absence of catalysts which would cause difficulty in their separation from the polymer, various catalysts such as acids, metallic halides, alkalies, clay, oxygen, peroxides, peracids, etc., are also contemplated as polymerizing agents in forming the polymeric materials of this invention.

The above examples represent typical procedures for thermal and catalytic polymerization, respectively, in accordance with the invention. The products of these examples as well as additional products typical of the invention are tabulated below to show variations in the resinous complex with changes in nature and composition of the modifying agent. In order to conserve space, the modifying agent is defined in each case as a wax substituted aromatic, i. e., a composition derived by alkylating an aromatic by reaction with chlorinated petroleum wax; with characteristic data indicated in parentheses. The first figure within the parentheses denotes the mol ratio of combined chlorine to aromatic while the second, separated from the first by a dash, indicates the chlorine content of the chlorinated wax. Thus "Wax phenol (3–16)" is the reaction product obtained by reacting phenol with 16% chlorwax in the mol ratio of 3 mols combined chlorine to 1 mol of phenol.

kylated aromatic bodies predominate. If, however, the proportions are such as to cause appreciable poly-alkylation of the aromatic nuclei the substances may be represented by the following general formula which is not an attempt to give however, an exact representation of the molecule. For simplicity, the different aromatic nuclei are represented by the phenyl radical.

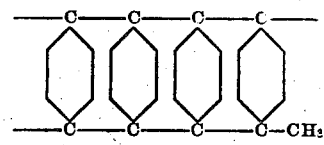

The compositions are represented in the foregoing formula with a single attachment of the aromatic group to each wax group, but in the reaction of chlorwax of high chlorine content with aromatic compounds as carried out in the preparation of hard resins suitable for the present purpose, apparently the aromatic group will be attached in some cases to more than one carbon of the same wax group, particularly in reactions with aromatic compounds of the condensed nuceli and polycyclic type.

Some chain formation would be expected to occur in the reaction of aromatic compounds with chlorinated waxes, in which case the following representation would be applicable, → representing a continuation of the chain structure:

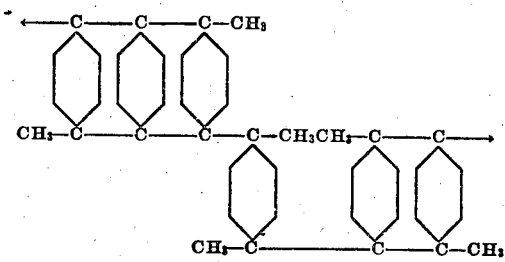

It is clear that the possible structures may be represented by the simple general formula:

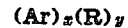

wherein Ar is an aromatic radical or nucleus, R represents an alkyl substituent on at least one nucleus Ar and $x$ and $y$ are integers.

Polystyrene-wax phenoyl complexes

| Example | Grams wax aromatic compound | Grams styrene | Catalyst | Solidifying point of product °C. | Combined wax aromatic compound Per cent | General character |
|---|---|---|---|---|---|---|
| 1 | 61 wax phenol (3–16) | 240 | Thermal | 125–135 | 24.6 | Waxlike. |
| 2 | 38 wax phenol (3–16) | 160 | 1 gram sodium | 140–150 | 27.6 | Do. |
| 3 | 38 wax diphenyl ether (3–16) | 80 | Thermal | 120–130 | 37.3 | Do. |
| 4 | 19 wax naphthalene (3–16) | 40 | do | 122–127 | 32.2 | Do. |
| 5 | 61 wax phenyl ethyl ether alcohol (3–14) | 240 | do | 156–163 | 25.1 | Do. |
| 6 | 61 (1–1) mixture wax phenol and wax phenolic acid (3–14) | 240 | do | 145–155 | 26.1 | Do. |
| 7 | 19 wax phenol (3–16) | 40 | 1 gram sodium | 170–180 | 36.6 | Do. |
| 8 | 38 wax phenol (3–16) | 80 | Thermal | 145–155 | 38.4 | Do. |
| 9 | 19 wax phenol (3–20) | 40 | do | 145–150 | 42.3 | Do. |
| 10 | 38 wax phenol (3–20) | 160 | do | 145–155 | 22.0 | Do. |
| 11 | 38 wax phenol (¾–45) | 160 | 1 gram sodium | 135–140 | 36.9 | Transparent. |
| 12 | do | 160 | Thermal | 125–135 | 23.9 | Do. |
| 13 | 19 wax naphthalene (¾–55) | 160 | 1 gram sodium | 155–165 | 20.2 | Do. |
| 14 | do | 160 | Thermal | 145–155 | 11.7 | Do. |

The structure of the modifying agent is, of course, indeterminate, the agent being a complex mixture. Where high ratios of aromatics are employed, it is likely that simple mono-al-

We claim:
1. The process which comprises polymerizing styrene in the presence of at least 10% by weight of a substance obtained by alkylating phenol with chlorinated petroleum wax of about 10% to 25% chlorine content in the presence of a Friedel-Crafts catalyst and in a mol ratio of combined chlorine to phenol not less than about 2 to 1.

2. A composition of matter prepared by polymerizing styrene in the presence of at least 10% by weight of a substance obtained by alkylating phenol with chlorinated petroleum wax of about 10% to 25% chlorine content in the presence of a Friedel-Crafts catalyst and in a mol ratio of combined chlorine to phenol not less than about 2 to 1.

ORLAND M. REIFF.
ALFRED P. KOZACIK.